(12) United States Patent
Obaidi

(10) Patent No.: US 10,588,018 B2
(45) Date of Patent: *Mar. 10, 2020

(54) ENHANCED SECURITY FOR ELECTRONIC DEVICES

(71) Applicant: T-Mobile USA, Inc., Bellevue, WA (US)

(72) Inventor: Ahmad Arash Obaidi, Tracy, CA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/421,363

(22) Filed: May 23, 2019

(65) Prior Publication Data

US 2019/0342755 A1  Nov. 7, 2019

Related U.S. Application Data

(63) Continuation of application No. 15/973,423, filed on May 7, 2018, now Pat. No. 10,356,620.

(51) Int. Cl.
*H04W 12/06* (2009.01)
*H04W 12/08* (2009.01)
*H04L 29/06* (2006.01)

(52) U.S. Cl.
CPC ......... *H04W 12/06* (2013.01); *H04L 63/0876* (2013.01); *H04W 12/08* (2013.01)

(58) Field of Classification Search
CPC . H04W 12/06; H04W 12/08; H04W 12/0802; H04W 60/005; H04W 36/0038
USPC .................................. 340/539.13; 455/435.1
See application file for complete search history.

(56) References Cited

U.S. PATENT DOCUMENTS

| 7,937,067 | B2 | 5/2011 | Maier et al. |
| 8,340,637 | B2 | 12/2012 | Drovdahl et al. |
| 8,442,482 | B2 | 5/2013 | Maier et al. |

(Continued)

FOREIGN PATENT DOCUMENTS

| KR | 20130008939 A | 1/2013 |
| WO | 2007110094 A1 | 10/2007 |

OTHER PUBLICATIONS

U.S. Appl. No. 15/973,423, Notice of Allowance dated Mar. 5, 2019, 15 pages.

(Continued)

*Primary Examiner* — William D Cumming
(74) *Attorney, Agent, or Firm* — Han Santos, PLLC

(57) ABSTRACT

This disclosure is directed to enhanced security of electronic devices that use IMEI numbers. In addition to a first IMEI number that is created and tracked by an OEM, a manufacturer of chipsets for cell phones creates a similar, but unique second IMEI number that is burned into logic at the chip level of chipsets. The second IMEI number includes a serial number of the chipset to uniquely identify the chipset that is associated with the second IMEI. A combination of a first IMEI and a second IMEI is stored with a registrar. When a device attempts to access a network, a combination of the first IMEI and the second IMEI stored on the device are authenticated with the registrar. If the combination is valid, then the device is allowed to access the network. Otherwise, the device is deemed to be an unauthorized device and access to the network is denied.

20 Claims, 3 Drawing Sheets

(56) References Cited

U.S. PATENT DOCUMENTS

| | | | |
|---|---|---|---|
| 8,477,941 B1* | 7/2013 | Dhanoa | H04W 36/0038 |
| | | | 380/270 |
| 8,755,767 B2 | 6/2014 | Maier et al. | |
| 8,880,067 B2* | 11/2014 | Atarius | H04W 60/005 |
| | | | 455/435.1 |
| 8,918,075 B2 | 12/2014 | Maier et al. | |
| 8,948,030 B2 | 2/2015 | Frederiksen et al. | |
| 9,055,443 B2* | 6/2015 | Froelich | H04W 12/0802 |
| 9,319,884 B2* | 4/2016 | Buzescu | H04W 12/08 |
| 9,380,042 B2* | 6/2016 | Horst | H04L 63/0876 |
| 9,380,417 B1 | 6/2016 | Boyle et al. | |
| 9,432,363 B2 | 8/2016 | Abdulrahiman et al. | |
| 9,491,048 B2 | 11/2016 | Thakkar et al. | |
| 9,591,484 B2* | 3/2017 | Ionescu | H04W 12/06 |
| 9,717,088 B2 | 7/2017 | Reisslein et al. | |
| 9,775,039 B2* | 9/2017 | Yocam | H04W 12/08 |
| 9,939,809 B1 | 4/2018 | Obaidi | |
| 9,989,658 B2* | 6/2018 | Smith | G01T 1/2985 |
| 9,992,307 B2 | 6/2018 | Johnsen et al. | |
| 10,020,872 B2 | 7/2018 | Murphy | |
| 10,298,617 B2* | 5/2019 | Obaidi | H04L 63/20 |
| 10,356,620 B1* | 7/2019 | Obaidi | H04W 12/06 |
| 10,373,169 B2* | 8/2019 | Todasco | H04L 63/0876 |
| 2003/0101188 A1 | 5/2003 | Teng et al. | |
| 2004/0025036 A1 | 2/2004 | Balard et al. | |
| 2006/0041884 A1 | 2/2006 | Nakamura | |
| 2006/0241898 A1* | 10/2006 | Seedahmed | G06K 9/6205 |
| | | | 702/152 |
| 2008/0278314 A1* | 11/2008 | Miller | G07C 5/008 |
| | | | 340/539.13 |
| 2010/0091961 A1 | 4/2010 | Jones et al. | |
| 2010/0197305 A1* | 8/2010 | Atarius | H04W 60/005 |
| | | | 455/435.1 |
| 2010/0291910 A1 | 11/2010 | Sanding et al. | |
| 2013/0281058 A1 | 10/2013 | Obaidi et al. | |
| 2014/0298429 A1* | 10/2014 | Horst | H04L 63/0876 |
| | | | 726/5 |
| 2015/0006898 A1 | 1/2015 | Mizikovsky | |
| 2016/0070527 A1 | 3/2016 | Ricci | |
| 2016/0086391 A1 | 3/2016 | Ricci | |
| 2016/0226999 A1 | 8/2016 | Johnsen et al. | |
| 2016/0358113 A1 | 12/2016 | Knipfer et al. | |
| 2017/0276809 A1* | 9/2017 | Smith | G01T 1/2985 |
| 2018/0007559 A1 | 1/2018 | Obaidi et al. | |
| 2018/0095456 A1 | 4/2018 | Obaidi | |
| 2018/0288193 A1 | 10/2018 | Johnsen et al. | |

OTHER PUBLICATIONS

U.S. Appl. No. 15/973,423, Non-Final Office Action dated Aug. 29, 2018, 27 pages.

International Application No. PCT/US2019/030953, International Search Report and Written Opinion dated Aug. 23, 2019, 11 pages.

* cited by examiner

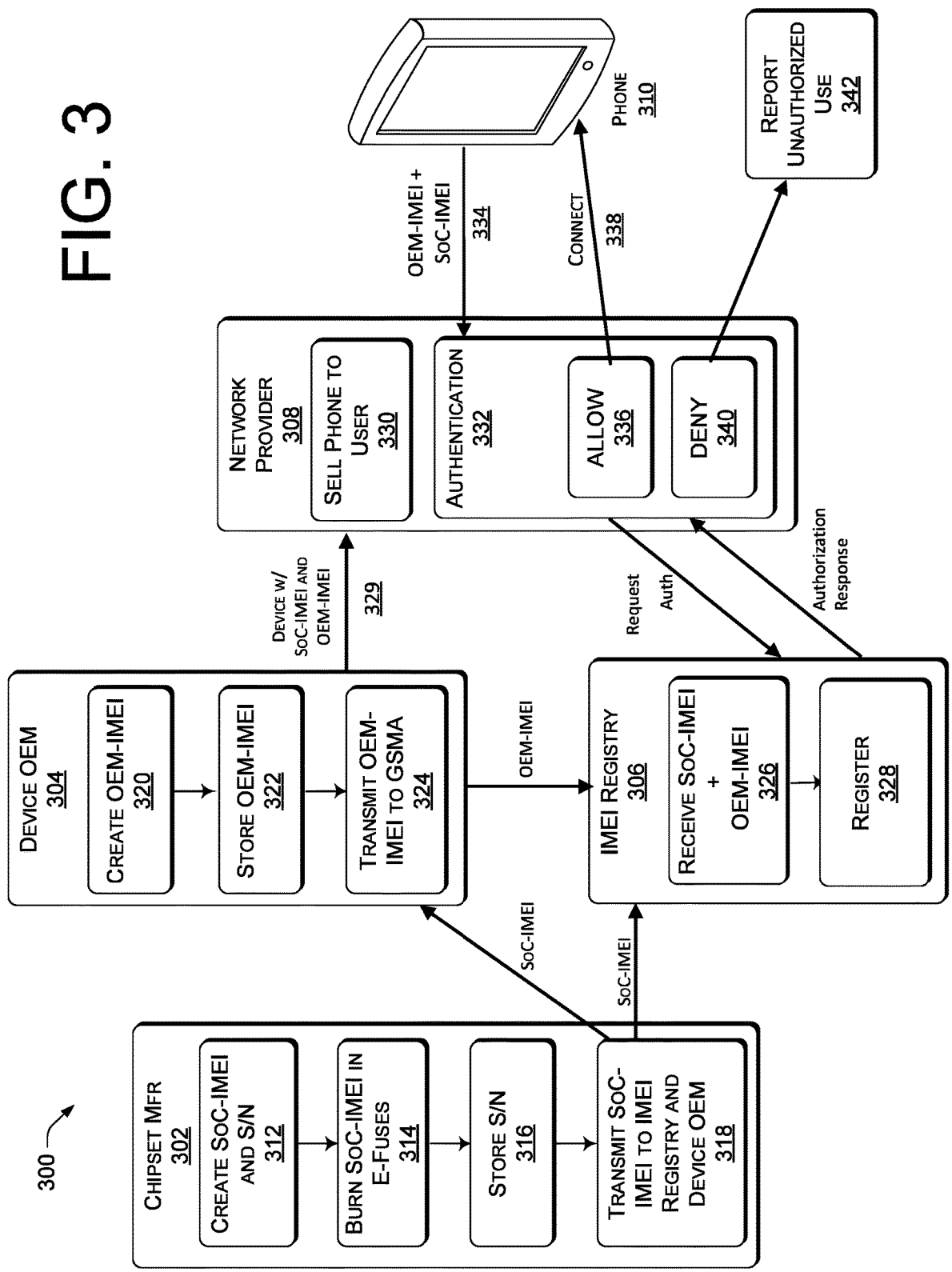

ENHANCED SECURITY FOR ELECTRONIC DEVICES

CROSS REFERENCE TO RELATED PATENT APPLICATION

This patent application is a continuation application of U.S. patent application Ser. No. 15/973,423, filed on May 7, 2018, entitled "Enhanced Security For Electronic Devices," which is hereby incorporated by reference in its entirety.

BACKGROUND

Theft of electronic devices, such as cell phones, tablet computers, etc., is a significant problem. Device manufacturers and cellular network providers have attempted several ways to thwart theft, including the use of an International Mobile Equipment Identity (IMEI) in 3GPP (3d Generation Partnership Project) phones, iDEN (Integrated Digital Enhanced Network) phones, and some satellite phones. The IMEI number is used by a GSM (Global System for Mobile Communications) network to identify valid devices and it can be used for stopping a stolen device from accessing that network by blacklisting any phone from using an IMEI number belonging to the stolen device. For example, if such a phone is stolen, the owner can call their network provider and instruct the provider to blacklist the phone using its IMEI number. This renders the phone useless on that network and sometimes other networks too, whether or not the phone's SIM (Subscriber Identity Module) card is changed. The network provider may associate with other network providers to share invalid IMEI numbers to enhance the blacklisting strategy.

IMEI numbers are regulated by GSMA (GSM Association), which assigns Type Allocation Codes (TAC) issued by GSMA. TAC are used in combination with manufacturer's codes to create an IMEI number, which is registered with GSMA to identify a maker of a phone, the type of phone, and a serial number of the phone. An IMEI number may also include a one-digit check digit or a two-digit software version number.

The IMEI number blacklisting strategy has its shortcomings. Although there is not a good reason for someone to change a phone's IMEI number—many jurisdictions even make the practice of doing so illegal—thieves will attempt to take non-blacklisted IMEI numbers and apply them to stolen devices in a practice known as "cloning." IMEI numbers are not supposed to be easy to change, making blacklisting effective. However, this is not always the case. A phone's IMEI number may be easy to change with specialized tools, such as tools to re-flash memory that stores an IMEI number. Also, an IMEI number is an unauthenticated mobile identifier. Spoofed IMEI numbers can thwart all efforts to track devices, or target devices for lawful intercept. Also, some network providers do not block tainted IMEI numbers, making blacklisting a less than perfect solution. Furthermore, a valid user may have a device blocked if he legitimately purchases a used phone and inserts a SIM card. A network provider may block the device since the IMEI number and the SIM card do not match.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 3 is a diagram of an example methodological implementation for enhancing security for electronic devices as described herein.

DETAILED DESCRIPTION

Overview

This disclosure is directed to technology for enhanced security of electronic devices that use IMEI numbers. In addition to the IMEI number that is created and tracked by an OEM (Original Equipment Manufacturer), a manufacturer of chipsets for cell phones creates a similar, but unique number that is burned into logic at the chip level of devices. The number includes a serial number of the chipset. For discussion purposes, a traditional IMEI number that is created by an OEM is referred to herein as an OEM-IMEI. A number that is created by a chipset manufacturer is referred to herein as a SoC-IMEI (System on a Chip-IMEI). Also, an OEM-IMEI is deemed to include a device serial number created by the OEM and uniquely identifying a device. Typically, a SoC-IMEI will include a chipset serial number created by the chipset manufacturer that uniquely identifies the chipset that contains the SoC-IMEI.

While an OEM-IMEI can be removed by re-flashing or some other method, removal of a SoC-IMEI is anticipated to destroy a chip and/or a chip set, thus making its removal prohibitively expensive. In operation, a combination of an OEM-IMEI and a SoC-IMEI is stored with a registrar. When a device attempts to access a network, the OEM-IMEI and the SoC-IMEI stored on the device are authenticated with the registrar. If the combination OEM-IMEI/SoC-IMEI is valid, then the device is allowed to access the network. Otherwise, the device is deemed to be an unauthorized (i.e., stolen) device and access to the network is not authorized.

Such technology provides an improvement in security of an electronic device, since the IMEI number cannot be spoofed and used with a different device (i.e., a device that has a different SoC-IMEI). The techniques described herein also provide chip set manufacturers greater control over how their products are used and tracked. In all, the technology described herein reduces the incentive for thieves to traffic in stolen devices.

Details regarding the novel techniques referenced above are presented herein and are described in detail, below, with respect to several figures that identify elements and operations used in systems, devices, methods, computer-readable storage media, etc. that implement the techniques.

Example Network Environment

Figure 1:
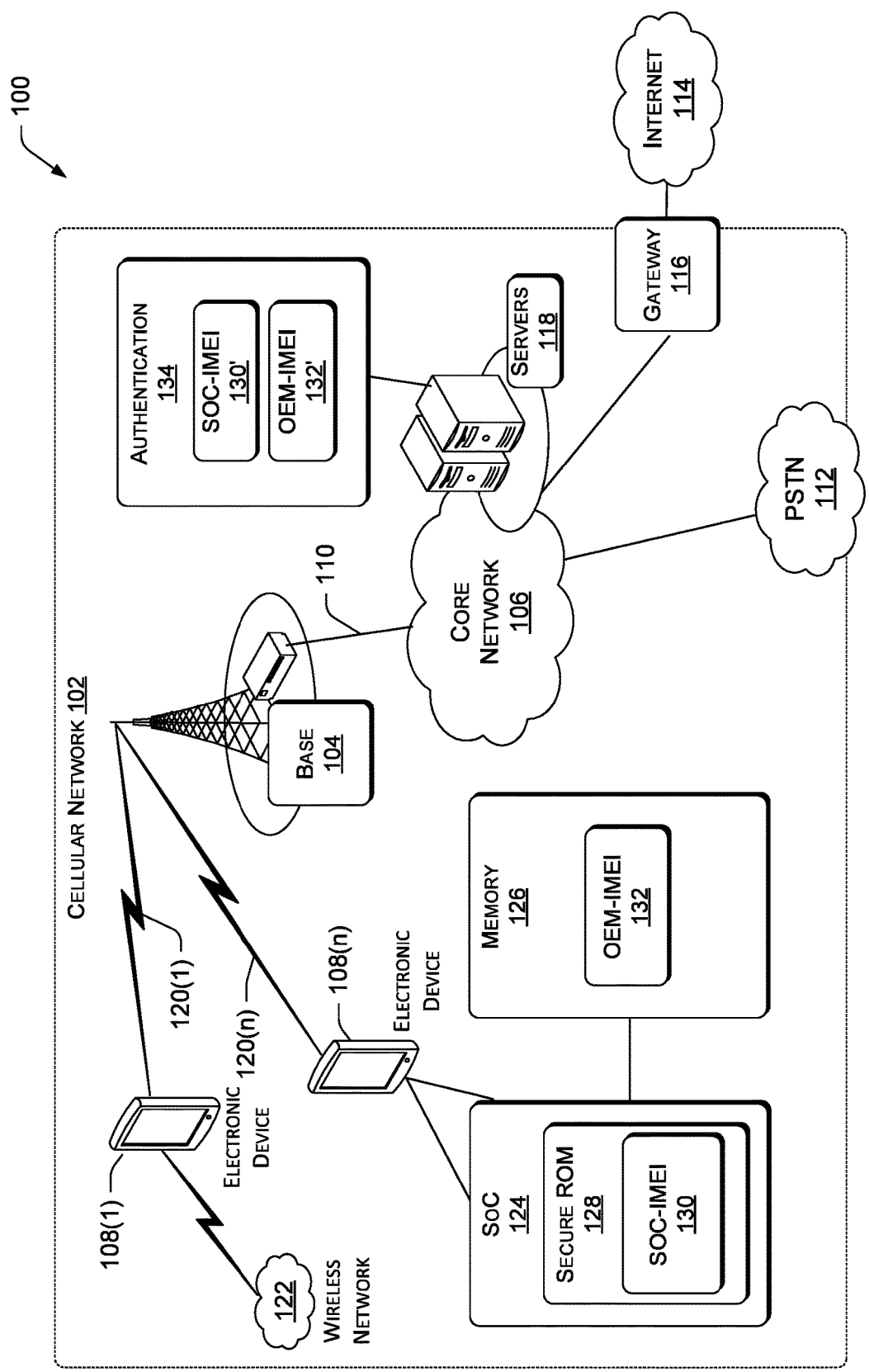
FIG. 1 is a diagram of an example cellular network environment in which the technological solutions described herein may be implemented.

FIG. 1 is a diagram of an example cellular network architecture 100 in which the technological solutions described herein may be implemented. FIG. 1 illustrates the concept of authenticating an electronic device for accessing a cellular network by use of an OEM-IMEI and a SoC-IMEI that are stored on the electronic device. It is noted that, although the present discussion refers to a cellular network, other network architectures may be used in place of the cellular network shown and described with respect to FIG. 1.

The cellular network architecture 100 includes a cellular network 102 that is provided by a wireless telecommunication carrier. The cellular network 102 includes at least a cellular network base station 104 and a core network 106. Although only one base station is shown in this example, the cellular network 102 may comprise any number of base stations. The cellular network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, 5G, CDMA-2000 (Code Division Multiple Access 2000), and/or so forth.

The base station 104 is responsible for handling voice and data traffic between electronic devices, such as electronic devices 108(1)-108(n), and the core network 106. The base station 104 is communicatively connected to the core network 106 via a corresponding backhaul 110. The backhaul 110 is implemented using copper cables, fiber optic cables, microwave radio transceivers, and/or the like.

The core network 106 also provides telecommunication and data communication services to the electronic devices 108(1)-108(n). In the present example, the core network 106 connects the electronic devices 108(1)-108(n) to other telecommunication and data communication networks, such as a public switched telephone network (PSTN) 112, and the Internet 114 (via a gateway 116) or other network that provides access to one or more web sites. The core network 106 includes one or more servers 118 that implement network components. For example, the network components (some elements not shown) may include a serving GPRS support node (SGSN) that routes voice calls to and from the PSTN 112, and a Gateway GPRS Support Node (GGSN) that handles the routing of data communication between external packet switched networks and the core network 106 via gateway 116. The network components may further include a Packet Data Network (PDN) gateway (PGW) that routes data traffic between the GGSN and the Internet 114.

Each of the electronic devices 108(1)-108(n) is an electronic communication device, including but not limited to, a smartphone, a tablet computer, an embedded computer system, etc. Any electronic device that is capable of using the wireless communication services that are provided by the cellular network 102 may be communicatively linked to the cellular network 102. For example, a user may use an electronic device 108 to make voice calls, send and receive text messages, and download content from the Internet 114. As stated, an electronic device 108 is communicatively connected to the core network 106 via base station 104. Accordingly, communication traffic between an electronic device 108(1)-108(n) and the core network 106 are handled by wireless interfaces 120(1)-120(n) that connect the electronic devices 108(1)-108(n) to the base station 104.

Each of the electronic devices 108(1)-108(n) are also capable of connecting to an external network, including the Internet, via a wireless network connection other than the cellular network wireless services. For example, as shown, the electronic device 108(1) includes a connection to the wireless network 122. The wireless connections are made by way of any method known in the art, such as Bluetooth®, Wi-Fi, Wireless Mesh Network (WMN), etc.

The electronic devices 108(1)-108(n) include certain security features stored therein. The electronic device 108(n) is representative of all electronic devices 108(1)-108(n), and includes a System-on-a-Chip (SoC) 124 and at least one other type of memory 126. The SoC 124 includes, among typical components, a secure read-only memory (SROM) 128 that stores a SoC-IMEI 130 that was created by a manufacturer of the SoC 124. The memory 126 stores an OEM-IMEI 132 that was created by a manufacturer of the electronic device 108(n). The memory 126 may be any kind of memory typically used in an electronic device such as a cell phone, including DRAM (Dynamic Random Access Memory), Read-Only Memory (ROM), flash memory (in a secured or unsecured area of the SoC), and the like.

The SoC-IMEI 130 and the OEM-IMEI 132 are designed to be used with an authentication module 134 executing on the servers 118. As shown in FIG. 1, the servers 118 include copies of the SoC-IMEI 130' and the OEM-IMEI 132' received from the electronic device 108(1). Further details of the operation of the authentication module 134 and use of the SoC-IMEI 130 and the OEM-IMEI 132 are discussed in greater detail, below, with respect to subsequent figures.

Example Secure Processing Unit

Figure 2:
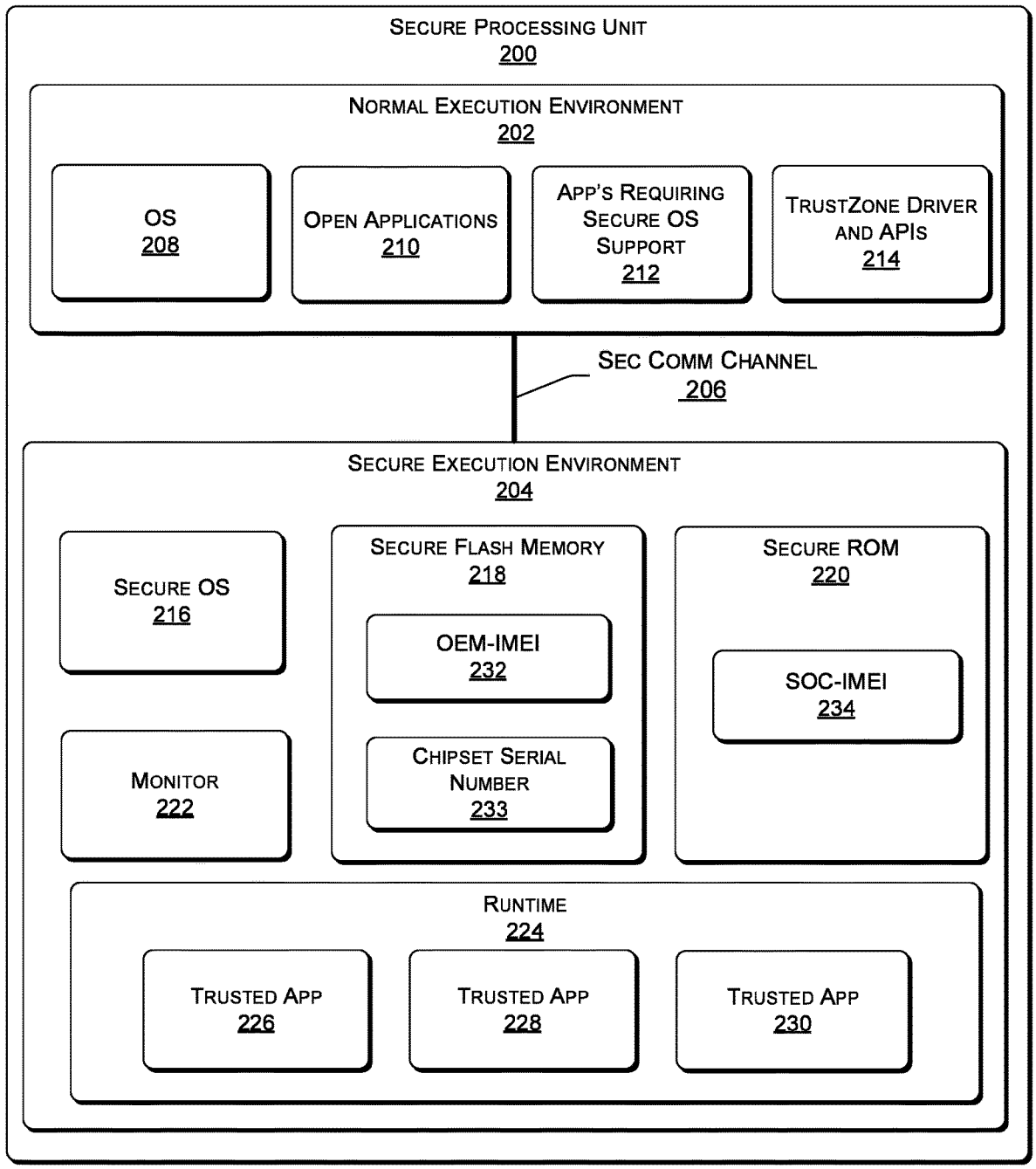
FIG. 2 is a diagram of an example secure processing unit in accordance with the technologies described herein.

FIG. 2 is a diagram of an example secure processing unit 200 in accordance with the technologies described herein. The example secure processing unit 200 is stored on one or more chips, including a CPU, in an electronic device, such as the electronic device 108(1) (FIG. 1). For purposes of the present discussion, the example secure processing unit 200 is situated on a SoC chipset, such as one of the Snapdragon® products manufactured by Qualcomm®. In a mobile phone, a SoC is a combination of a chipset and a processor (CPU). Unlike in computers, the CPU is soldered on the chipset inside a mobile device, which tends to improve the performance, and saves a significant amount of space. A chipset is basically a motherboard in a phone that interfaces with phone components and enable the components to communicate with each other. It is made of integrated circuits and provides all the inter-communication channels (buses) to connect, e.g. a camera chip, a Bluetooth chip, a Wi-Fi chip, a touch screen chip, etc., with a CPU and with memory (Flash, RAM, ROM). The CPU is responsible for carrying out the instructions of a computer program by performing the basic arithmetical, logical, and input/output operations of the system. As depicted, the execution environment is similar to the Qualcomm® Secure Execution Environment (QSEE), but can be any kind of execution environment in which the described security techniques can be practiced.

The example secure processing unit 200 includes a normal execution environment 202 and a secure execution environment 204, connected by a secure communication channel 206. The normal execution environment 202 includes components that are typically found in SoCs, including a device operating system 208, and open (i.e. normal) applications 210 that do not require any enhanced security. The normal execution environment 202 may also include one or more applications 212 requiring secure operating system support, and one or more TrustZone® drivers/APIs (application programming interfaces) 214. TrustZone® is a well-known provider of digital certificates and is used as an example herein. However, although TrustZone® features are used to describe the components and operations performed in the example implementation described herein, one or more other implementations may use other security applications that provide for secure operations within a SoC.

The secure execution environment 204 allows secure storage of a unique chipset identifier that identifies a specific chipset in which the secure operating environment 204 exists. This makes using a unique chipset identifier more feasible than a previous alternative of burning such an identifier into hardware fuses in the chipset, as it can be written more efficiently and at less cost than with previous methods.

The secure execution environment 204 includes a secure operating system 216, a secure flash memory 218, a secure read-only memory (ROM) 220, and a system monitor 222. The secure execution environment 204 also includes a runtime 224 that supports execution of multiple trusted applications, to-wit: trusted application 226, trusted application 228, and trusted application 230. The trusted applications 226-230 are commonly referred to as "trustlets" in a TrustZone® environment.

An OEM-IMEI 232 and a chipset serial number 233 are stored in the secure flash memory 218, and a SoC-IMEI 234 is stored in the secure ROM 220. The OEM-IMEI 232 is a typical IMEI number that is created by a device manufacturer and uniquely identifies a device in which the OEM-IMEI 232 is stored. In the present example, the OEM-IMEI 232 conforms to GSMA standards, but in one or more alternate implementations, the OEM-IMEI 232 may be any other type of unique identifier. The SoC-IMEI 234 is a number that uniquely identifies a chipset that includes the example secure processing unit 200. The SoC-IMEI 234 may be in a format similar to the GSMA standard, but may be any number created by a chipset manufacturer to uniquely identify the chipset that includes the example secure processing unit 200. In at least one implementation, at least a portion of the SoC-IMEI 234 includes the chipset serial number 233. This increases security by protecting the chipset serial number 233 from being re-flashed for illicit use. As discussed below, the SoC-IMEI 234 may be provided to a registrar in a system similar to the current GSMA system for IMEI numbers. The SoC-IMEI 234 is fused into the secure ROM 220, i.e. it is etched into the circuitry of the example secure processing unit 200 and, therefore, is not likely to be compromised without destroying the example secure processing unit 200.

As described in greater detail, below, a trusted application 226-230 (i.e., a trustlet) can be configured to access the SoC-IMEI 234 stored in the SROM 220. The trusted application 226-230 can then pass the SoC-IMEI 234 over the secure communication channel 206 to an open application 210 in the normal execution environment 202. The operating system 208 can then pass the SoC-IMEI 234 to an external entity to authenticate a device containing the example secure processing unit 200.

Further functionality of the example secure processing unit 200 and its component features is described in greater detail, below, with respect to an example of a methodological implementation of the novel techniques described and claimed herein.

Example Methodological Implementation—Authentication Using SoC-IMEI

FIG. 3 is a diagram 300 that depicts a methodological implementation of at least one aspect of the techniques for enhancing security in electronic devices disclosed herein. In the following discussion of FIG. 3, continuing reference is made to the elements and reference numerals shown in and described with respect to the example cellular network architecture 100 of FIG. 1, and the example secure processing unit 200 of FIG. 2. In the following discussion related to FIG. 3, certain operations may be ascribed to particular system elements shown in previous figures. However, alternative implementations may execute certain operations in conjunction with or wholly within a different element or component of the system (s).

The diagram 300 shows multiple entities and how they interact in the described implementation. The entities shown include a chipset manufacturer 302, a device OEM 304, an IMEI registry 306, a cellular network provider 308 and a cell phone 310. The implemented process will be described in terms of operations that occur at each entity and in terms of what information is passed between entities.

Chipset Manufacturer

The chipset manufacturer 302 creates the chipset serial number 233 and the SoC-IMEI 234 at block 312 and etches or burns the SoC-IMEI 234 into the SROM 220 at block 314. The chipset manufacturer 302 stores the chipset serial number 233 in the secure flash memory 218 at block 316. At block 318, the chipset manufacturer 302 transmits the SoC-IMEI 234 to the IMEI registry 306 and to the device OEM 304. Although shown here using an IMEI registry 306, in one or more alternative implementations, such a registry can be implemented by and/or stored at the chipset manufacturer 302, the device OEM 304, the cellular network provider 306, or a different entity.

Device OEM

At block 320, the device OEM 304 creates an OEM-IMEI 232 that may be similar to or distinct from IMEI numbers currently utilized in network communication systems. The OEM-IMEI 232 is stored in the secure flash memory 218 at block 322, and is then transmitted to the IMEI registry 306 at block 324. The device OEM 304 may also transmit the OEM-IMEI 232 to the chipset manufacturer 302 if the chipset manufacturer 302 maintains its own tracking system that identifies a device into which a particular chipset was installed.

IMEI Registry

The IMEI registry 306 receives the SoC-IMEI 234 from the chipset manufacturer 302, and the OEM-IMEI 232 from the device OEM 304 at block 326. At block 328, the IMEI registry 306 registers and correlates the OEM-IMEI 232 and the SoC-IMEI 234 so that when an authorization request is received from the network provider 308, the IMEI registry 306 can provide the SoC-IMEI 234 and the OEM-IMEI 232 to the network provider 308.

Network Provider

The device OEM 304 provides the phone 310 to the network provider 308 at step 329. The phone 310 now includes the SoC-IMEI 234 stored in the SROM 220 and the OEM-IMEI 232 stored in the secure flash memory 218. The network provider 308 then sells the phone 310 to a user at block 330. When the phone 310 attempts to access the cellular network 102 (FIG. 1) at 334, the phone 310 provides the OEM-IMEI 232 and the SoC-IMEI 234 to the network provider 308. An authentication module 332 (FIG. 1, 134) at the network provider 308 checks to see if the pairing of the OEM-IMEI 232 and the SoC-IMEI 234 is proper. It can either do this by requesting the information from the IMEI registry 306, or the network provider 308 may maintain its own database for the purpose.

If the pairing of the OEM-IMEI 232 and the SoC-IMEI 234 is correct, then the authentication module 332 allows the access at block 336, and the phone 310 is then connected to the cellular network 102 at 338. If there is incorrect information in either the OEM-IMEI 232, the SoC-IMEI 234, or the pairing thereof, then the authentication module 332 denies the authentication request (block 340). At block 342, the authentication failure may be reported to appropriate authorities, which can be a law enforcement agency, the network provider, the device OEM, the IMEI registry 306, the chipset manufacturer, etc. Any entity that can assist in blacklisting a device that failed authentication may be notified.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device, comprising:
   a chipset;
   a secure processing unit in the chipset;
   a memory in which is stored a first identifier that uniquely identifies the electronic device;
   a secure read-only memory (SROM) in which is stored a second identifier that uniquely identifies the chipset;
   an operating system configured to control:
      providing the first identifier and the second identifier in a communication to check correctness of the first identifier and the second identifier against pairings of identifiers in a registry of International Mobile Equipment Identity (IMEI) numbers, which are registered with the GSM Association (GSMA); and
      obtaining access to a communication network in accordance with correctness of the first identifier and the second identifier.

2. The electronic device as recited in claim 1, wherein the first identifier includes an Original Equipment Manufacturer-IMEI (OEM-IMEI) assigned to the electronic device by a manufacturer of the electronic device.

3. The electronic device as recited in claim 2, wherein the second identifier includes a System-on-a-Chip-IMEI (SoC-IMEI) number assigned to the chipset by a manufacturer of the chipset.

4. The electronic device as recited in claim 3, wherein the SROM includes circuitry and the SoC-IMEI is etched into the circuitry.

5. The electronic device as recited in claim 3, wherein the OEM-IMEI is stored in memory other than the SROM that stores the SoC-IMEI.

6. A method, comprising:
   receiving a first identifier from a mobile device that uniquely identifies the mobile device;
   receiving a second identifier from the mobile device that uniquely identifies a chipset installed in the mobile device;
   obtaining a determination as to whether the first identifier and the second identifier are paired in a registry of device identifiers; and
   denying access to a telecommunication network by the mobile device in response to obtaining a determination that the first identifier and the second identifier are not paired in the registry of device identifiers.

7. The method as recited in claim 6, further comprising reporting that the mobile device is an unauthorized device if the first identifier and the second identifier are determined to be not paired in the registry.

8. The method as recited in claim 6, further comprising:
   receiving a request from the mobile device for access to the telecommunication network;
   wherein the obtaining includes:
      receiving a pairing of a device identifier and a chipset identifier from the registry; and
      determining whether the first identifier and second identifier represent a correct pairing by comparison with the received pairing.

9. The method as recited in claim 8, further comprising storing the received pairing and disallowing future access to the telecommunication network to any mobile device presenting the same pairing.

10. The method as recited in claim 6, further comprising:
    notifying a blacklist-assisting entity of an authentication failure in accordance with the determination that the first identifier and the second identifier are determined to be not paired in the registry of device identifiers.

11. The method as recited in claim 6, wherein the first identifier includes a serial number associated with the mobile device.

12. The method as recited in claim 6, wherein the second identifier includes a serial number associated with the chipset.

13. The method as recited in claim 6, further comprising disabling the mobile device if the first identifier and the second identifier are determined to be not paired in the registry.

14. The method as recited in claim 6, wherein:
    the registry of device identifiers is a registry of International Mobile Equipment Identity (IMEI) numbers, which are registered with the GSM Association (GSMA);
    the first identifier includes an Original Equipment Manufacturer-IMEI (OEM-IMEI) number assigned to the mobile device by a manufacturer of the mobile device; and
    the second identifier includes a System-on-a-Chip-IMEI (SoC-IMEI) number assigned to the chipset by a manufacturer of the chipset.

15. One or more computer-readable storage media including computer-executable instructions that, when executed by a computer, perform the following operations:
    receiving a request from a mobile device to access a telecommunication network;
    receiving an International Mobile Equipment Identity (IMEI) number and a System-on-a-Chip-IMEI (SoC-IMEI) number for the mobile device;
    determining whether a pairing of the IMEI number and the SoC-IMEI number of the mobile device is a correct pairing by reference to a registry of device identifiers; and
    allowing access to the telecommunication network by the mobile device in response to determining that the pairing is correct.

16. The one or more computer-readable storage media as recited in claim 15, wherein the operations further comprise denying access to the telecommunication network by the mobile device in response to determining that the pairing is incorrect.

17. The one or more computer-readable storage media as recited in claim 15, wherein the operations further comprise:
    storing the pairing; and
    disallowing future access to the telecommunication network by any mobile device presenting the OEM-IMEI and SoC-IMEI if the pairing is incorrect.

18. The method as recited in claim 6, the registry of device identifiers is a registry of International Mobile Equipment Identity (IMEI) numbers, which are registered with the GSM Association (GSMA).

19. The method as recited in claim 6, wherein the registry is implemented by the device Original Equipment Manufacturer (OEM).

20. The method as recited in claim 6, wherein the registry is implemented by the telecommunication network provider.

* * * * *